No. 854,593. PATENTED MAY 21, 1907.
L. NELSON.
PESSARY.
APPLICATION FILED FEB. 27, 1906.

WITNESSES:
G. Russell Newton
Bella Terry Matthews

INVENTOR:
Louise Nelson

THE NORRIS PETERS CO., WASHINGTON, D. C.

UNITED STATES PATENT OFFICE.

LOUISE NELSON, OF OAKLAND, CALIFORNIA.

PESSARY.

No. 854,593.　　　Specification of Letters Patent.　　　Patented May 21, 1907.

Application filed February 27, 1906. Serial No. 303,282.

To all whom it may concern:

Be it known that I, LOUISE NELSON, a citizen of the United States, residing in the city of Oakland, Alameda county, State of California, have invented a new and useful Improvement in a Pessary, of which the following is a specification.

My invention relates to an improvement in pessary, the object being to furnish a sanitary contrivance to be used by ladies during menstruation and also a more comfortable support for the womb than heretofore. I attain these objects by means of a hard rubber tube with a slightly extended edge, forming a cup shape, also a soft rubber tube fitted on the outside which prevents the hard rubber edges from injuring the flesh, the pessary being supported on a hard rubber stem which has a small cross tube at its lower end allowing elastic cord to be run through and fasten on a waist or straps from the shoulders.

Figure 1:
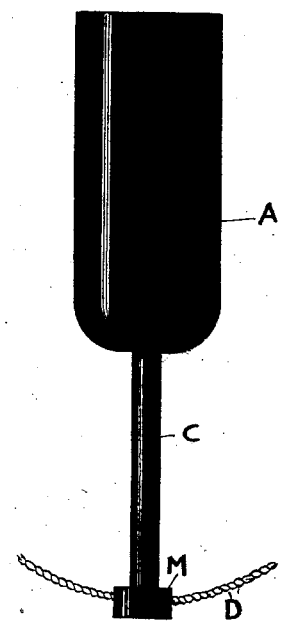
Figure 2:
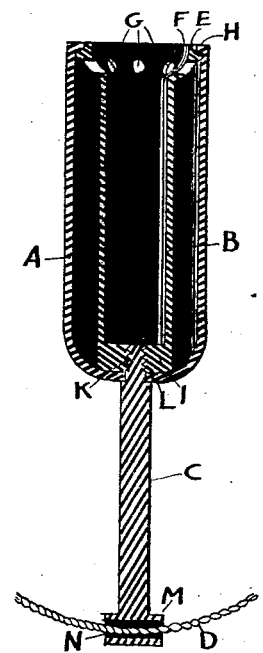

Referring to the drawing, Figure 1, shows the hard rubber tube inside of the soft rubber tube, and hard rubber stem adjusted ready for use. Fig. 2 shows a half cut or the inside view of the two tubes A and B.

The hard rubber tube (B) is a half inch tube about two and a half inches long having an extended edge (E) forming a cup shape with perforations (G) and (F). On the lower end it has a shoulder (I) which screws on to the hard rubber stem (C) thereby also fastening the soft rubber tube.

The hard rubber stem (C) has a small cross tube at the lower end and a threaded shoulder (K) which screws in to the hard rubber tube (B) thereby securing the close fitting edge of the roft rubber tube between the shoulder (K) and (I).

The outside soft rubber tube (A) is simply an attachment that can be used or not by springing apart, the top edge (H) and inserting the tube (B) its hard rubber edge (E) will hold it in place. The soft rubber edge (H) being smaller in the center inside of the cup than the diameter its close fitting edges at the bottom is fastened between the two shoulders (K) and (I).

In using the hard rubber tube there would be a large soft sponge sewed on through the holes on the inside of the cup (E), large enough to protrude over the edges, that would fill the vagina and catch the flow. The slight curvature of the cup (F) would collect and deposit the drainage on the inside of the hard rubber tube (B) as it would naturally run to the center of the sponge.

The same makes an excellent pessary as it is much smaller in the cup and does not press into the flesh, the womb resting on the sponge.

I claim:

1. An improvement in pessary a hard rubber tube with extended edge cup shape and shoulder, a soft rubber tube adjustable to the hard rubber tube, its top edge springing apart and slips over the hard rubber edges and small opening at the bottom, it fitting over the hard rubber tube from the top.

2. An improvement in pessary a hard rubber tube extended edge forming a cup, a soft rubber tube adjusted to the outside and fitting over the cup. A hard rubber solid stem with shoulder which screws into the shoulder of the hard rubber tube and thereby holding the soft rubber tube between the stem and the hard rubber tube. Said hard rubber stem has a short cross tube at its lower end.

LOUISE NELSON.

Witnesses:
　G. RUSSELL NEWTON,
　BELLA TERRY MATTHEWS.